United States Patent [19]

Fewell

[11] 4,215,490
[45] Aug. 5, 1980

[54] BRAILLE DEAF-BLIND COMMUNICATORS

[76] Inventor: William B. Fewell, 124 Dow Rd., Port Charlotte, Fla.

[21] Appl. No.: 852,145

[22] Filed: Nov. 16, 1977

[51] Int. Cl.$^2$ .............................................. G09B 21/04
[52] U.S. Cl. ..................................................... 35/35 A
[58] Field of Search .................................. 35/35 A, 38

[56] References Cited

U.S. PATENT DOCUMENTS

| | | | |
|---|---|---|---|
| 2,012,924 | 8/1935 | Conklin | 35/35 A |
| 2,892,266 | 6/1959 | Tompkins | 35/35 A |
| 3,289,327 | 12/1966 | Chevillon | 35/35 A |
| 4,079,825 | 3/1978 | Fewell | 400/122 |

FOREIGN PATENT DOCUMENTS

| | | | |
|---|---|---|---|
| 741288 | 11/1955 | United Kingdom | 35/35 A |
| 770243 | 3/1957 | United Kingdom | 35/35 A |

*Primary Examiner*—William H. Grieb
*Attorney, Agent, or Firm*—Hauke and Patalidis

[57] ABSTRACT

A hand held and portable device used for communicating between blind-deaf persons and between blind-deaf and nonhandicapped persons who know the Braille system. The transmitter person presses one or a number of the six keys in combinations producing raised projections representing a six unit Braille cell to be felt and read by a receiving person through tactile finger sensation.

5 Claims, 4 Drawing Figures

U.S. Patent  Aug. 5, 1980  4,215,490
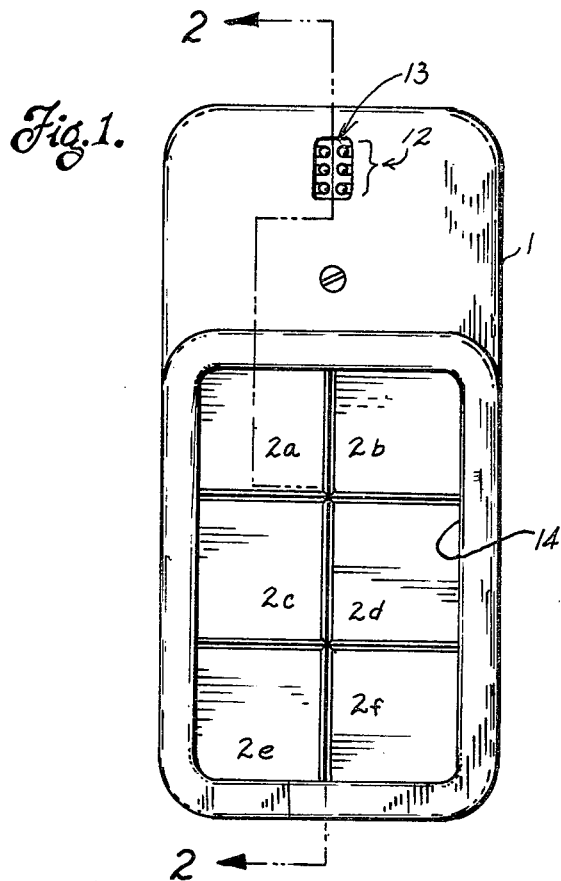
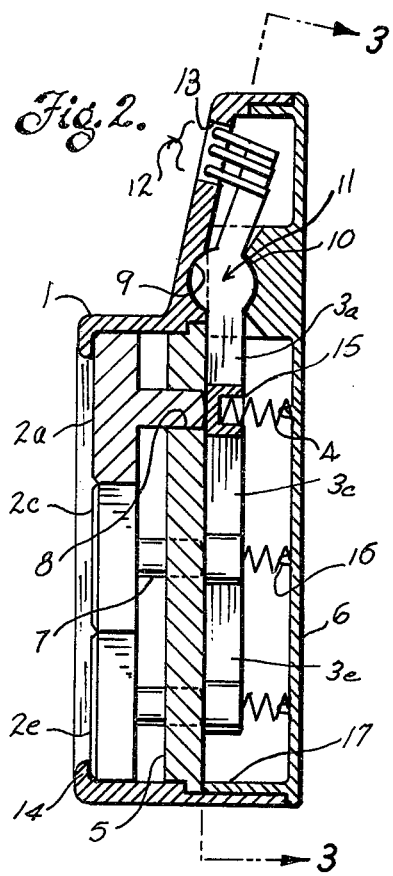
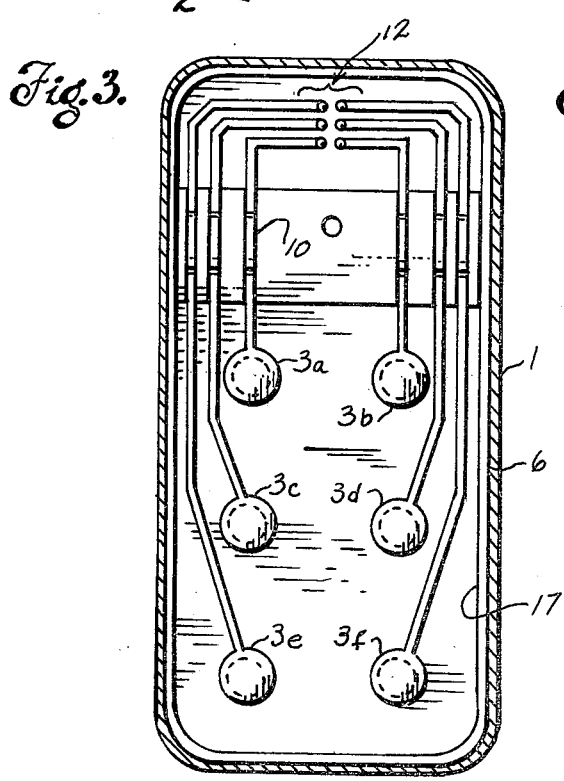
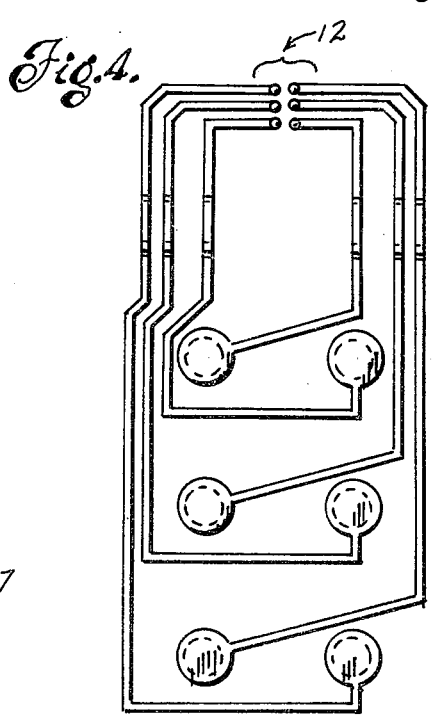

BRAILLE DEAF-BLIND COMMUNICATORS

OBJECTS OF THE INVENTION

This invention has for an object to provide a portable means for communicating with a deaf-blind person who knows the Braille system. Also the apparatus may be used for communicating between two deaf-blind persons.

Another object is to provide a simple means of communicating between handicapped persons having the use of only one hand and three fingers.

A further object is to provide an apparatus which is small enough to be carried in the purse of pocket and be hand held when communicating.

Still a further object of this invention is to expedite the speed of the Braille or Braille like system whereas the keys are spaced close to one another such that one finger may bridge several keys and two or more fingers may bridge several or all keys such that one stroke of the hand will produce up to six dots or projections to be felt by the Braille reader.

Another object is to provide a means of transmitting the Braille system for persons familiar with the awl punching method by having the six keys of the apparatus oriented the same as the six units of a Braille cell. The sender or transmitter presses the appropriate key or keys and the reader or receiver feels the projections, caused by key activation, and reads the characters of Braille in their raised configuration.

Another object is to provide a means of transmitting the Braille system for persons not familiar with the awl punching method who can only read Braille. The invention allows for a modification which will afford orienting the keys such that the keys are matched to raised units of the Braille cell.

BRIEF DESCRIPTION OF THE DRAWINGS

In the accompanying drawing:

FIG. 1 is a top plan view of the invention.

FIG. 2 is a sectional view taken substantially along the line 2—2 of FIG. 1.

FIG. 3 is a sectional view taken substantially along the line 3—3 of FIG. 2.

FIG. 4 shows schematically a modification of the structure of FIG. 3.

DETAILED DESCRIPTION OF THE INVENTION

Having reference to the drawings, the device is more fully described as follows:

The device, FIGS. 1-3, comprises a cover 1, six keys 2a-2f, six key arms 3a-3f, six springs 4, a platform 5, and a base 6. Modified key arms, FIG. 4, also form a part of the description and are further described herein.

To form a Braille like character, one key 2a-2f is depressed or a plurality of keys 2a-2f are depressed simultaneously. When a key 2a-2f is depressed, its stem, indicated by numeral 7, is forced through a hole, indicated by numeral 8, in the platform 5, and forces downward a key arm 3a-3f. The key arm 3a-3f have convex projecting portions, FIG. 2, engaged in concave slots, indicated by numeral 9, in the cover 1 and numeral 10 in the base 6. The concave slots 9 and 10, along with the convex portion of the key arms 3a-3f, serve to contain the key arms 3a-3f and afford a pivotal action about a point, indicated by arrow 11. When a key 2a-2f is forced downward, the key arm 3a-3f contacted is forced downward, and is pivoted about point 11 causing projectile points, indicated by numeral 12, to protrude through a slot in the cover 1. The projectile points are felt and read by the receiver person familiar with the Braille system when their characters are formed by the transmitting person depressing keys 2a-2f.

Springs 4 return the keys 2a-2f and key arms 3a-3f to normal positions. Keys 2a-2f are contained within the cover 1 by a flange, indicated by arrow 14, a part of the cover 1. Springs 4 are held in place by indentations, indicated by numeral 15, in the key arms 3a-3f and by protuberances, indicated by numeral 16, in the base 6.

The platform 5 is held in place by rests in the cover 1 and by flanges 17 of the base 6.

Key arms as shown in FIG. 4 replace key arms 3a-3f when the transmitting person desires to orient keys 2a-2f such that Braille characters in raised configuration will be the same orientation as when reading Braille.

I claim:

1. A portable hand held Braille-like communication apparatus comprising a housing, a cover for said housing, a platform in said housing, a six-key keyboard mounted in a cut-out portion of said cover, each key of said keyboard having a stem passing through said platform, a key arm corresponding to each key disposed below said platform and having an end in engagement with the stem of said key and another end provided with a pointed projection, pivot means for each key arm for causing said pointed projection to project through an aperture in said cover when the key actuating said key arm is depressed away from a rest position, and biasing means urging said key and key arm to said rest position, wherein said pivot means for said key arm is a convex projecting portion intermediary said ends of said key arm, said projecting portion being disposed in corresponding contour slots in said housing, said pointed projections are closely grouped as a six unit Braille-like cell disposed in said aperture in said cover, the keys of said keyboard are also grouped as a Braille-like cell and are closely juxtaposed and arranged in an array of three superimposed rows of two keys each such that at least two of said keys may be actuated by a single finger of a transmitter person, whereby a transmitter person selectively depressing any number of said keys in a predetermined position causes the same number of said pointed projections to project through said aperture in the same pattern to enable a receiving person to feel said pointed projections and determine the character formed by said transmitter person.

2. The apparatus of claim 1 wherein said six-unit cell is a Braille character cell.

3. A portable hand held Braille-like communication apparatus comprising a housing, a cover for said housing, a platform in said housing, a six-key keyboard mounted in a cut-out portion of said cover, each key of said keyboard having a stem passing through said platform, a key arm corresponding to each key disposed below said platform and having an end in engagement with the stem of said key and another end provided with a pointed projection, pivot means for each key arm for causing said pointed projection to project through an aperture in said cover when the key actuating said key arm is depressed away from a rest position, and biasing means urging said key and key arm to said rest position, wherein said housing cover has a flange projecting over at least one lateral area of each of said keys, said flange providing abutment means for each of said keys when urged by said biasing means to said rest position, said pointed projections are closely grouped as a six unit Braille-like cell disposed in said aperture in said cover, and the keys of said keyboard are also grouped as a Braille-like cell and are closely juxtaposed and arranged in an array of three superimposed rows of two keys each such that at least two of said keys may be actuated by a single finger of a transmitter person, whereby a transmitter person selectively depressing any number of said keys in a predetermined position causes the same number of said pointed projections to project through said aperture in the same pattern to enable a receiving person to feel said pointed projections and determine the character formed by said transmitter person.

4. The apparatus of claim 3 wherein said six-unit cell is a Braille character cell.

5. The apparatus of claim 1 wherein said housing cover has a flange projecting over at least one lateral area of each of said keys, said flange providing abutment means for each of said keys when urged by said biasing means to said rest position.

* * * * *

UNITED STATES PATENT AND TRADEMARK OFFICE
CERTIFICATE OF CORRECTION

PATENT NO. : 4,215,490

DATED : August 5, 1980

INVENTOR(S) : William B. Fewell

It is certified that error appears in the above—identified patent and that said Letters Patent are hereby corrected as shown below:

Column 2, line 3, after "slot" insert --13--.

Signed and Sealed this

Twenty-fifth Day of November 1980

[SEAL]

Attest:

SIDNEY A. DIAMOND

Attesting Officer

Commissioner of Patents and Trademarks